United States Patent
Song

(10) Patent No.: US 10,423,019 B1
(45) Date of Patent: Sep. 24, 2019

(54) FOLDABLE DISPLAY DEVICE

(71) Applicant: PREXCO CO., LTD, Chungcheongnam-do (KR)

(72) Inventor: In-Sung Song, Incheon (KR)

(73) Assignee: Prexco Co., LTD., Chungcheongnam-Do (KR)

( * ) Notice: Subject to any disclaimer, the term of this patent is extended or adjusted under 35 U.S.C. 154(b) by 0 days.

(21) Appl. No.: 16/111,564

(22) Filed: Aug. 24, 2018

(30) Foreign Application Priority Data

May 28, 2018 (KR) .................. 10-2018-0060260

(51) Int. Cl.
G02F 1/1333 (2006.01)
E05D 11/10 (2006.01)
E05D 3/12 (2006.01)
E05D 11/00 (2006.01)

(52) U.S. Cl.
CPC .. *G02F 1/133305* (2013.01); *G02F 1/133308* (2013.01); *E05D 3/122* (2013.01); *E05D 11/0054* (2013.01); *E05D 11/1064* (2013.01); *E05Y 2900/606* (2013.01); *G02F 2001/133328* (2013.01)

(58) Field of Classification Search
CPC ......... G02F 1/133305; G02F 1/133308; G02F 2001/133328; E05D 3/122; E05D 11/0054; E05D 11/1064; E05Y 2900/606
See application file for complete search history.

(56) References Cited

U.S. PATENT DOCUMENTS

| | | | | |
|---|---|---|---|---|
| 9,235,239 B2 * | 1/2016 | van Dijk | ............... | G06F 1/1652 |
| 9,250,733 B2 * | 2/2016 | Lee | ............ | H04M 1/02 |
| 9,348,450 B1 * | 5/2016 | Kim | ...................... | G06F 1/1681 |
| 9,477,269 B2 * | 10/2016 | Morrison | .............. | G06F 1/1681 |
| 9,811,119 B2 * | 11/2017 | Seo | ........ | G06F 1/1652 |
| 2011/0063783 A1 * | 3/2011 | Shim | ..................... | G06F 1/1615 361/679.01 |
| 2012/0236484 A1 * | 9/2012 | Miyake | ................. | G06F 1/1616 361/679.01 |
| 2013/0021762 A1 * | 1/2013 | van Dijk | ............... | G06F 1/1652 361/749 |
| 2014/0111954 A1 * | 4/2014 | Lee | ....................... | G06F 1/1641 361/749 |
| 2015/0055287 A1 * | 2/2015 | Seo | ...................... | G06F 1/1652 361/679.27 |
| 2016/0378203 A1 * | 12/2016 | Kim | ..................... | G06F 1/1616 345/156 |

FOREIGN PATENT DOCUMENTS

KR 10-0909713 7/2009
KR 10-2012-0129234 11/2012

* cited by examiner

Primary Examiner — James Wu
Assistant Examiner — Hung Q Dang
(74) Attorney, Agent, or Firm — Fay Sharpe LLP

(57) ABSTRACT

Disclosed is a foldable display device. According to an embodiment of the present invention, the foldable display device includes a first body and a second body that are formed in the same shape as a plate and are arranged symmetrically with each other, and a hinge device assembled to connect the first body and the second body to each other, such that the hinge device rotates within an opened state range where the first and second bodies are placed on the same plane and within a closed state range where the first and second bodies overlap each other.

5 Claims, 15 Drawing Sheets

[Fig. 1]
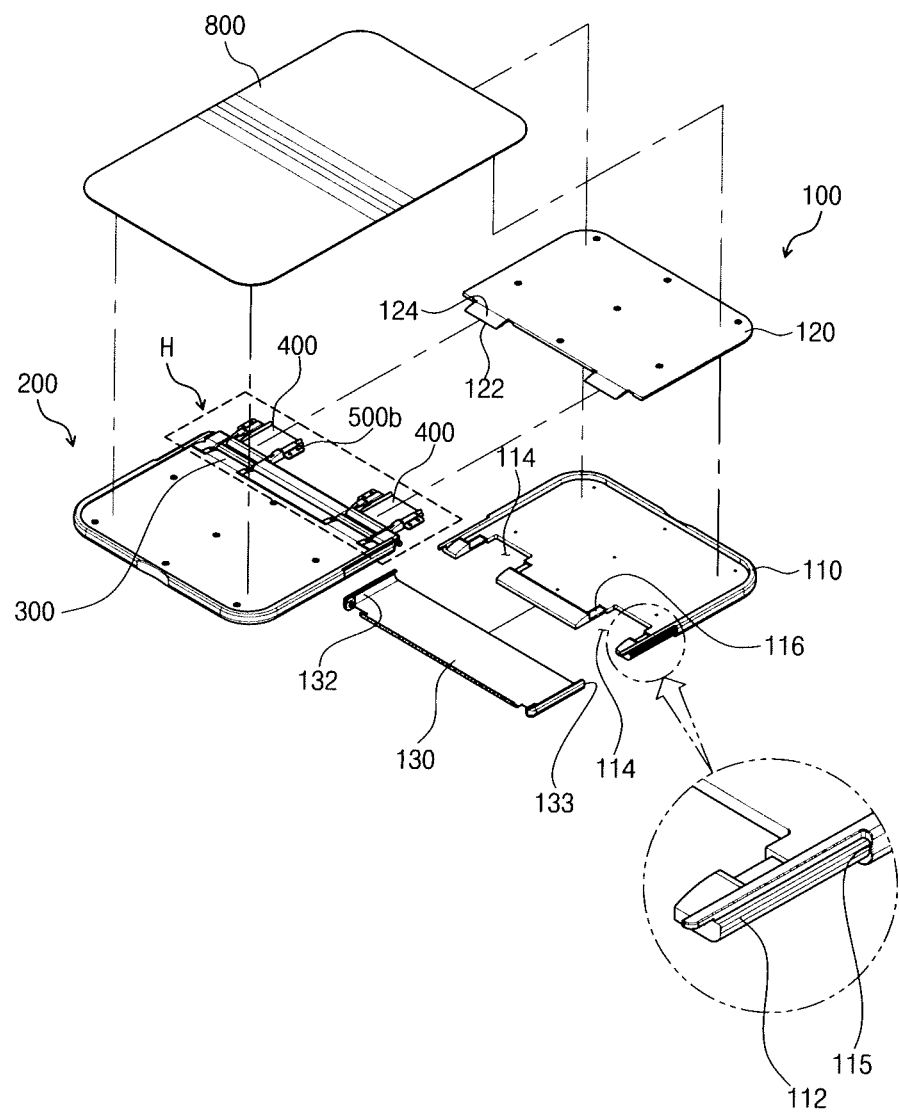

[Fig. 2]
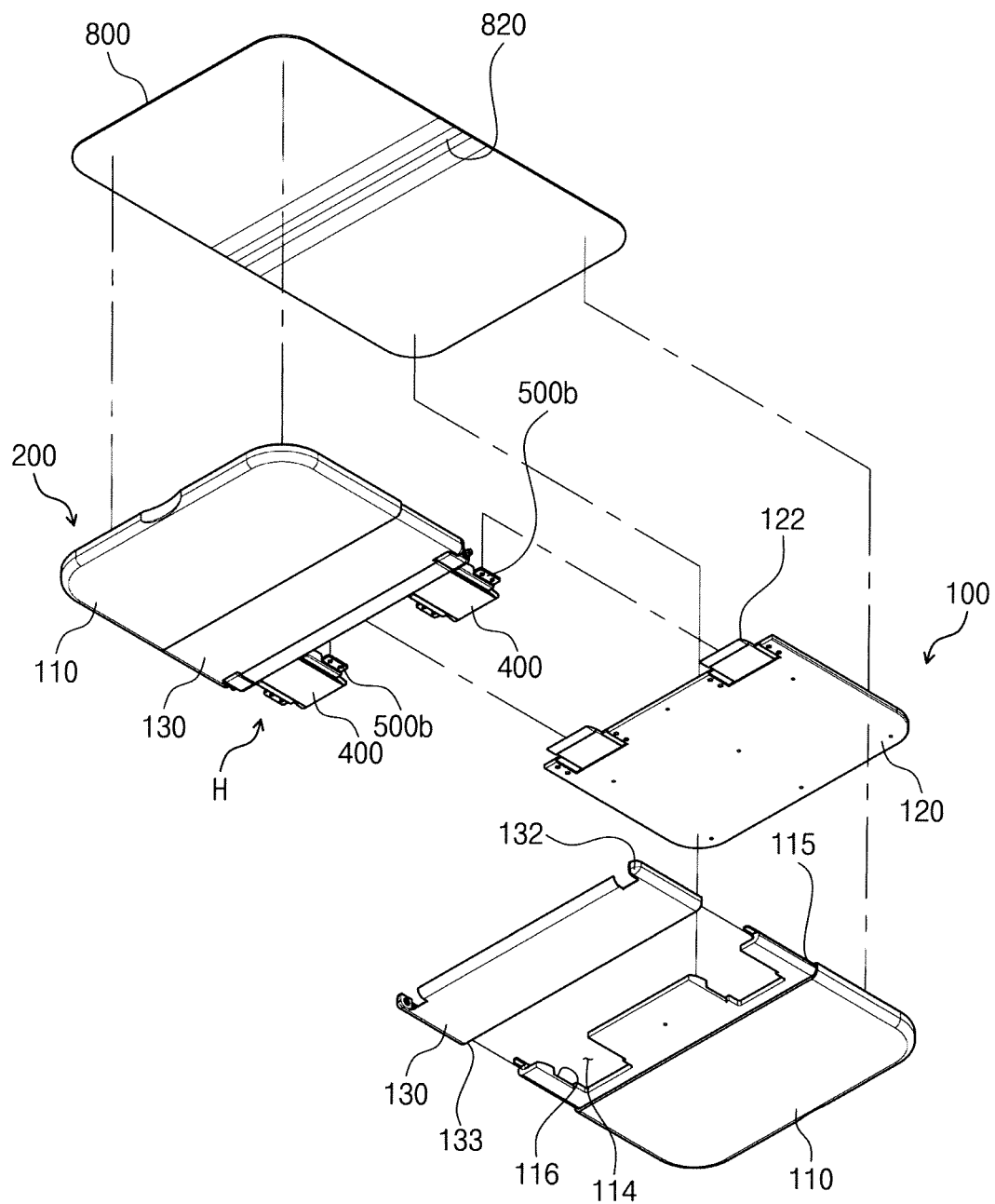

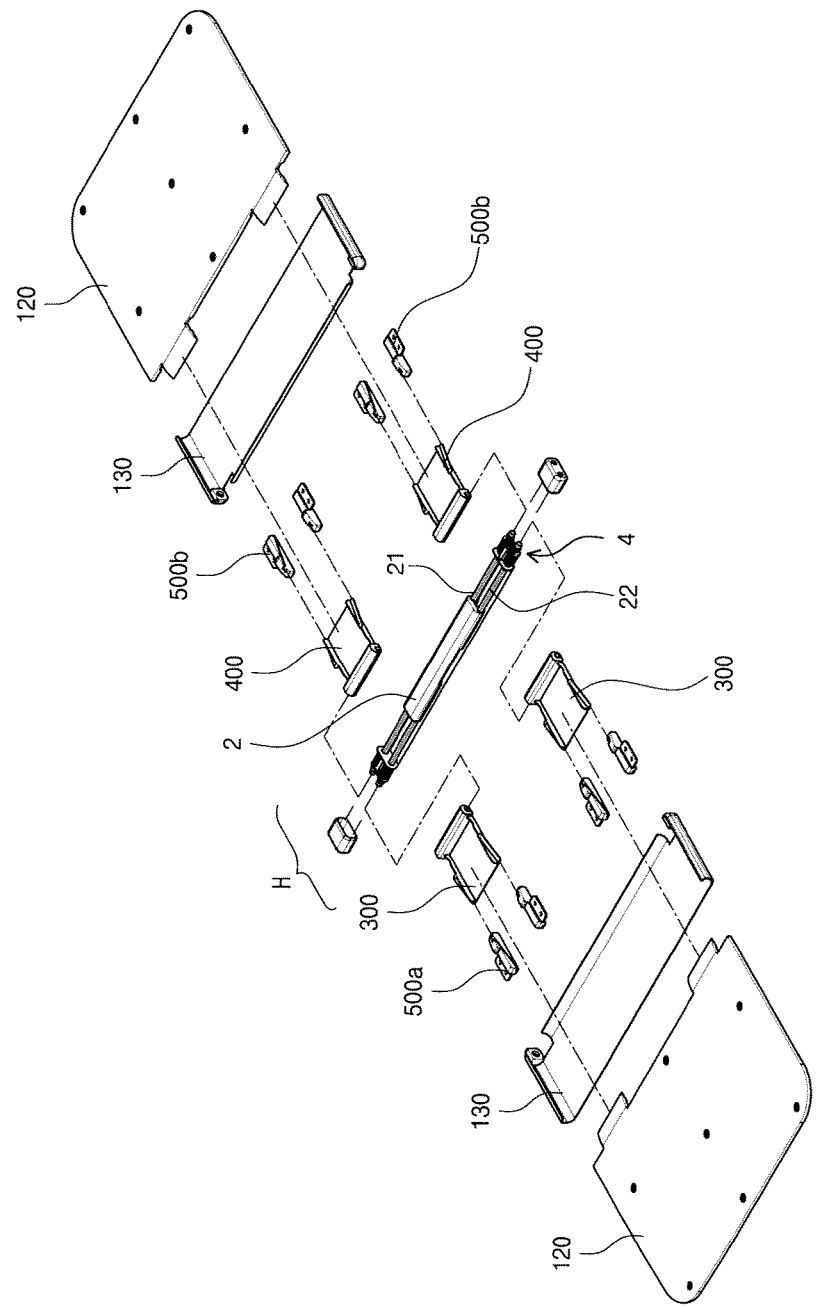
[Fig. 3]

[Fig. 4]
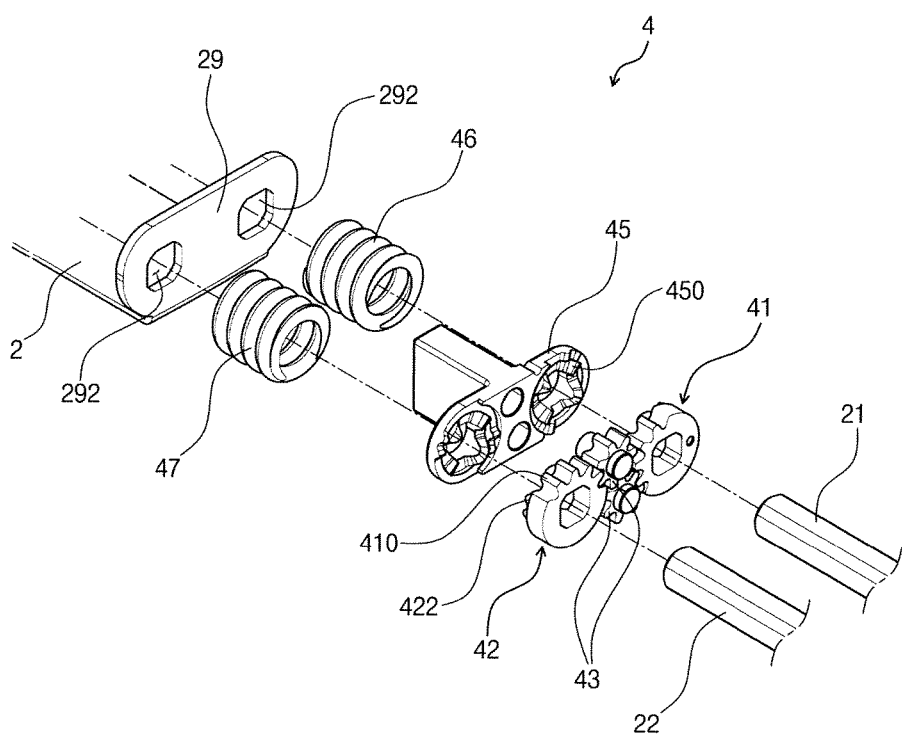

[Fig. 5]
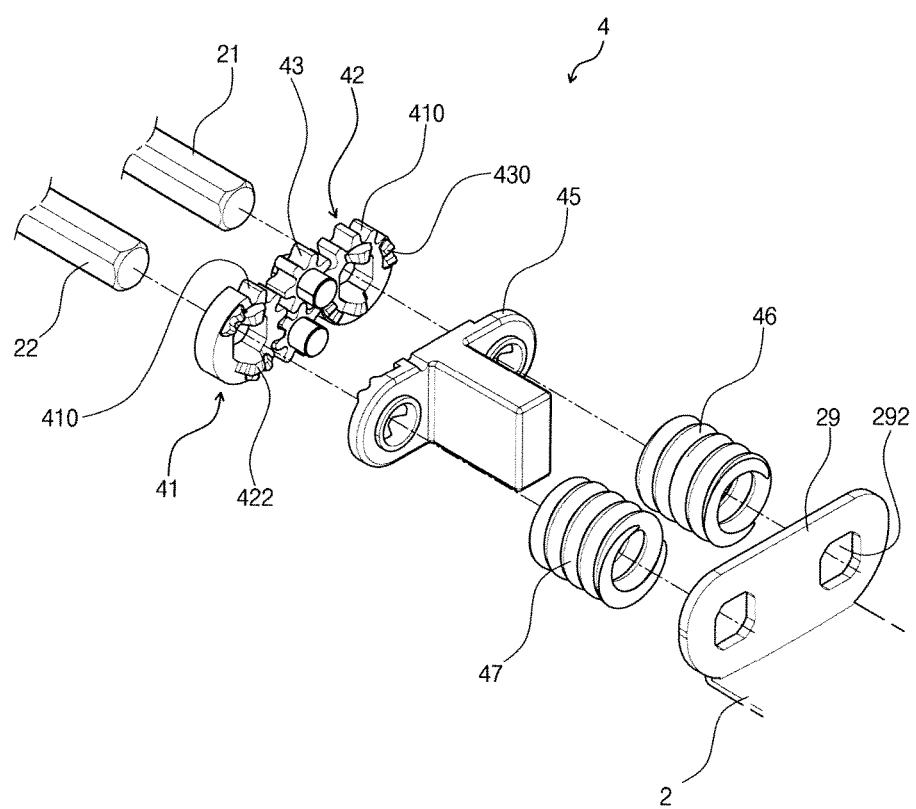

[Fig. 6]
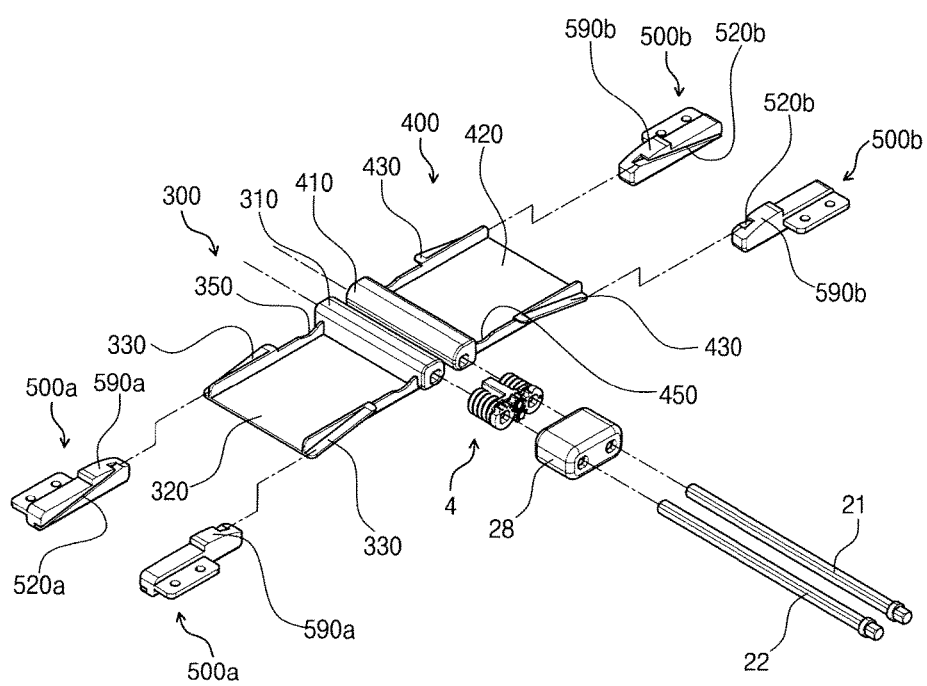

[Fig. 7]
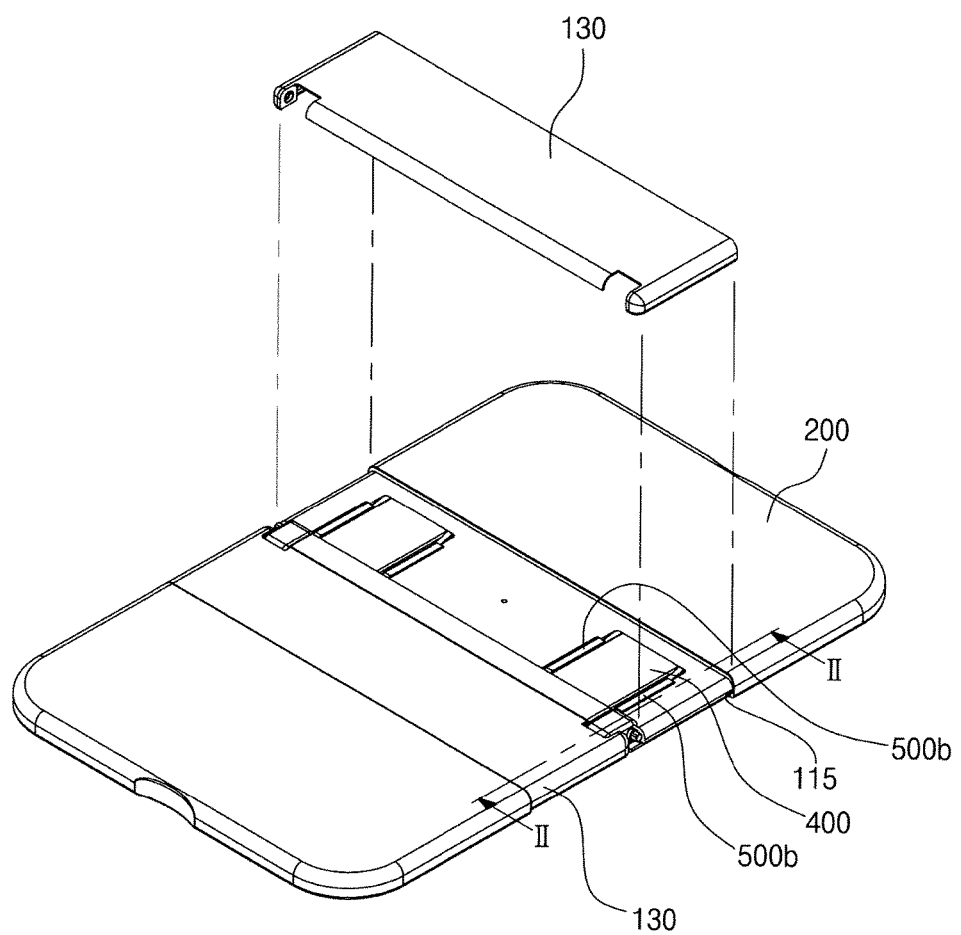

[Fig. 8]
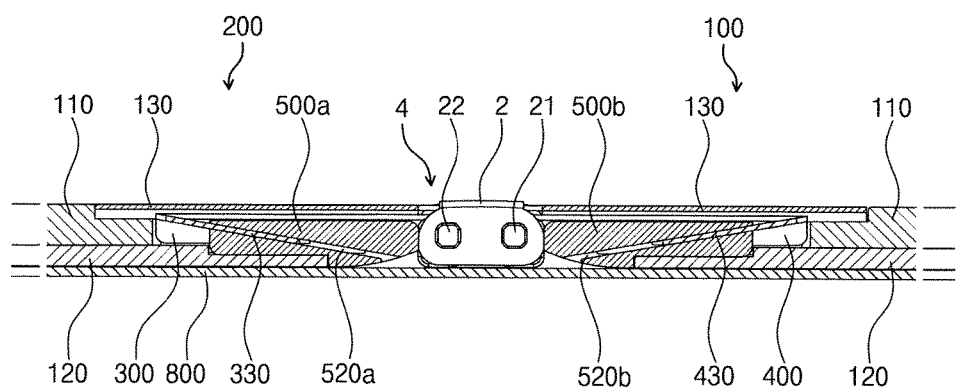

[Fig. 9]
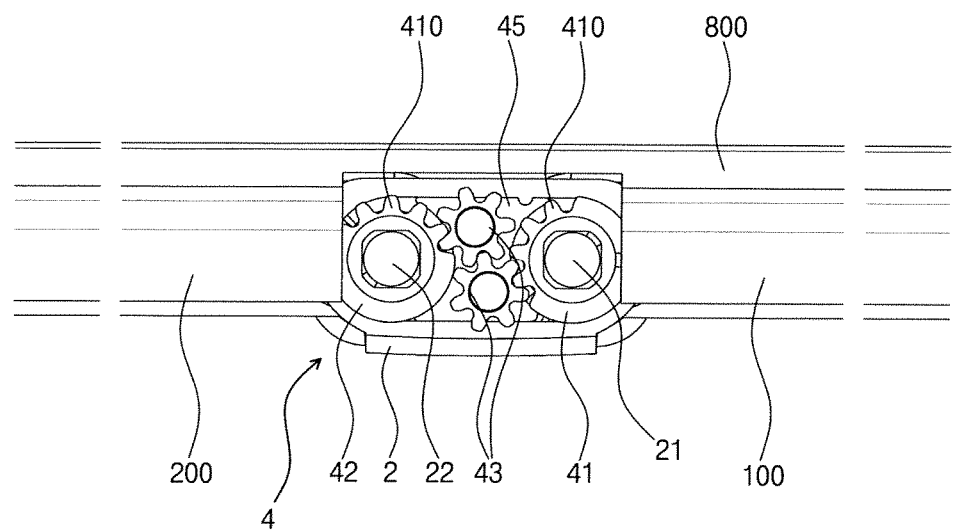

[Fig. 10]
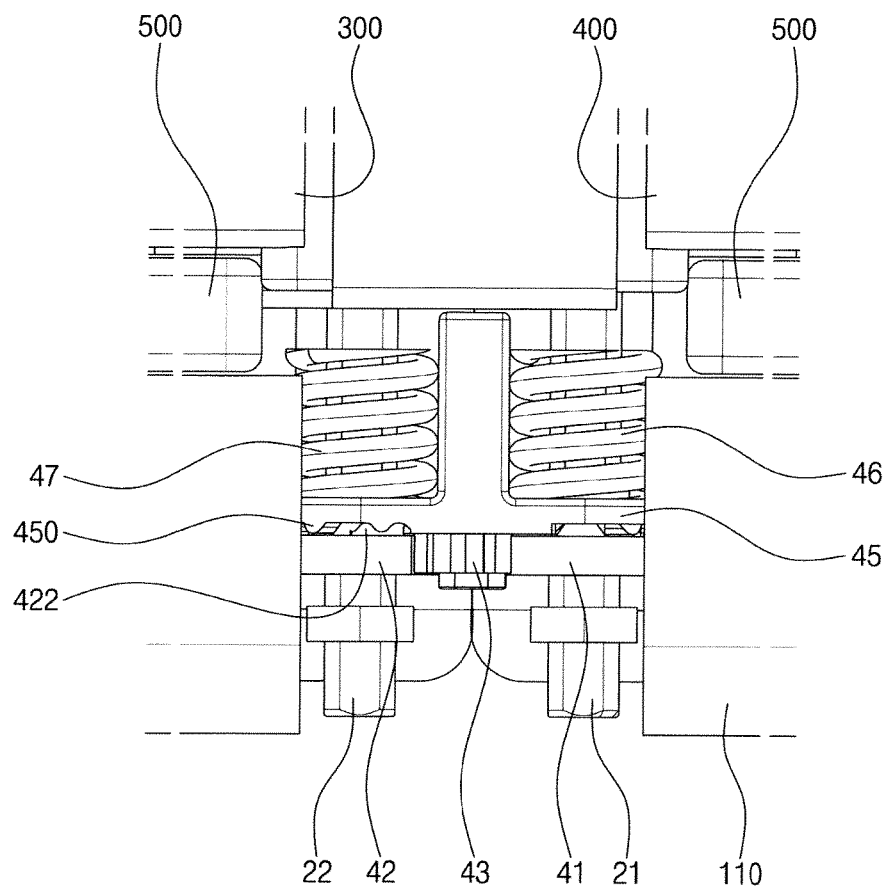

[Fig. 11]
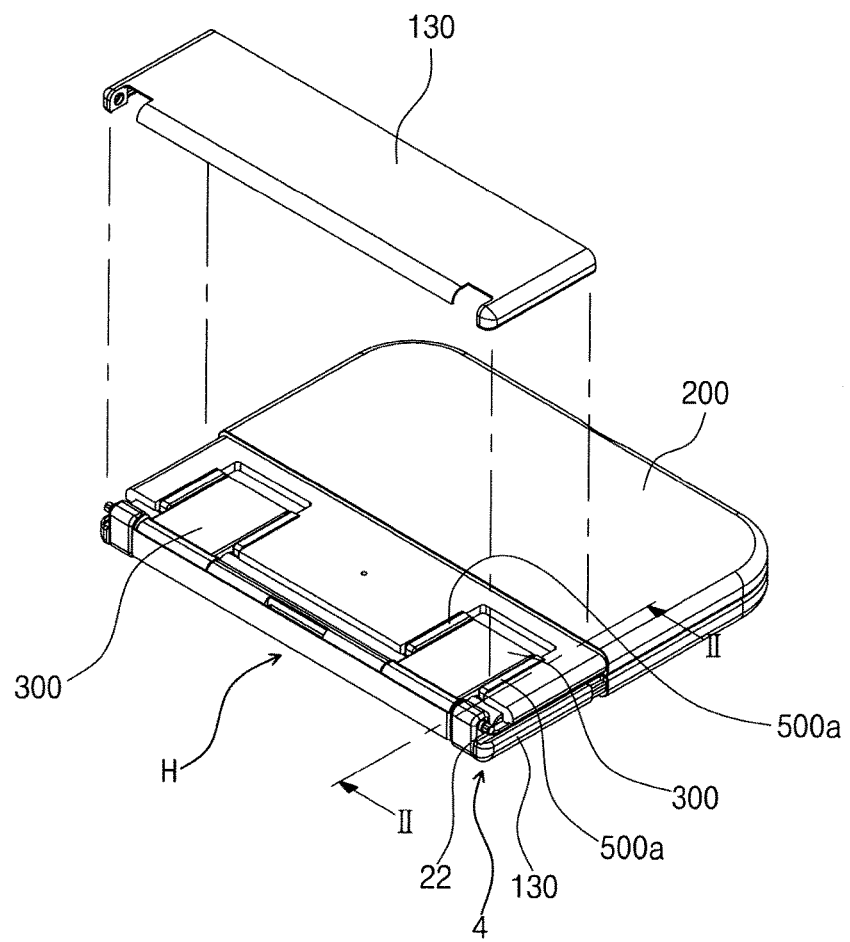

[Fig. 12]
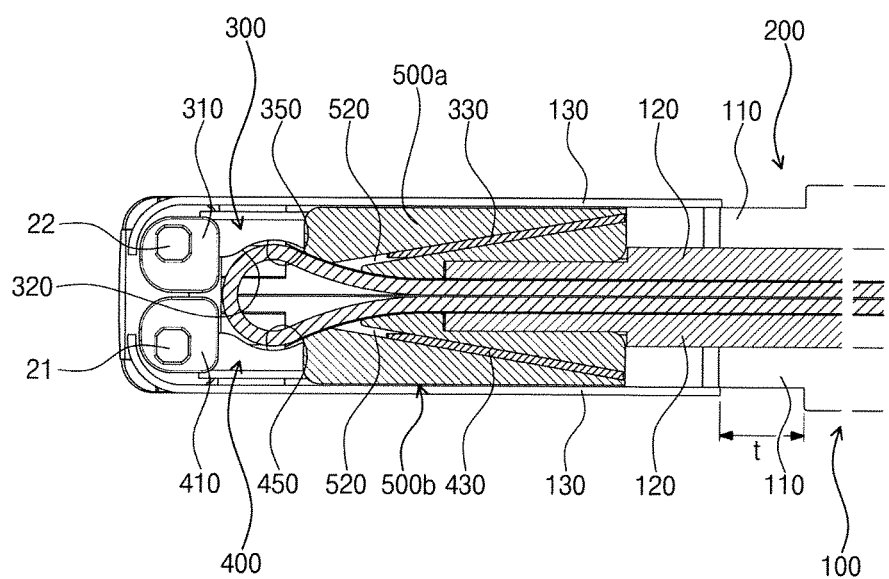

[Fig. 13]
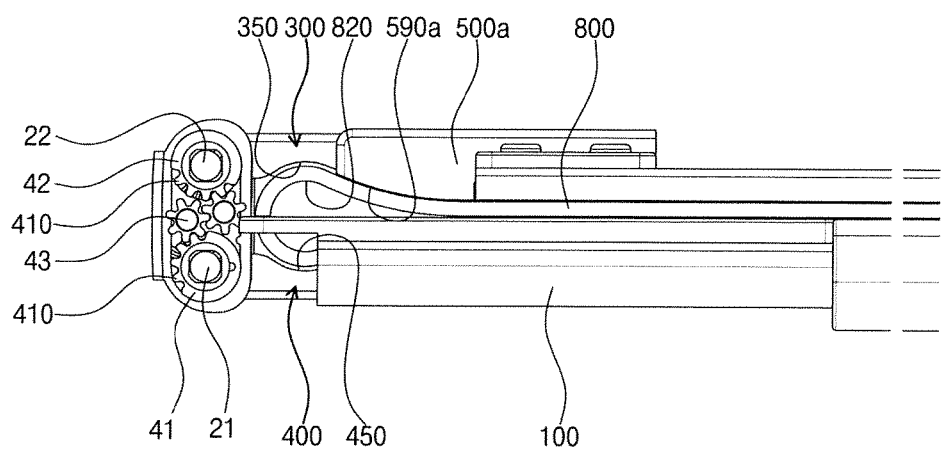

[Fig.14]
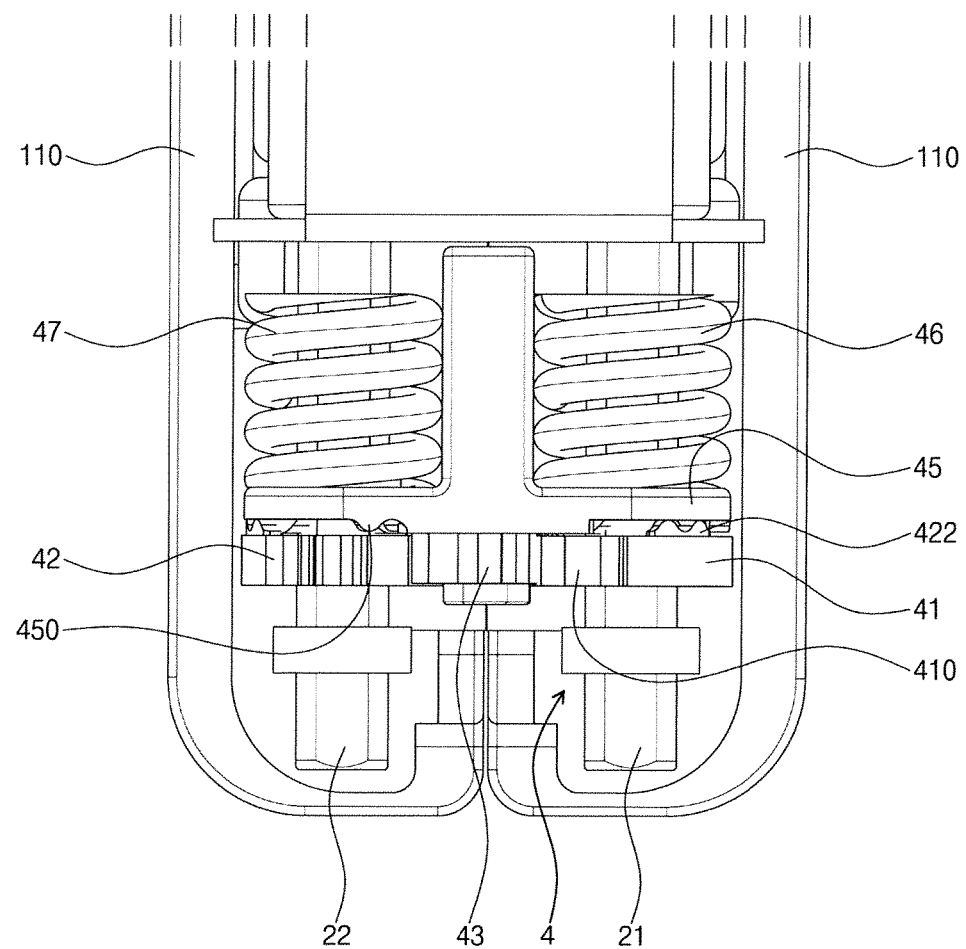

[Fig. 15]
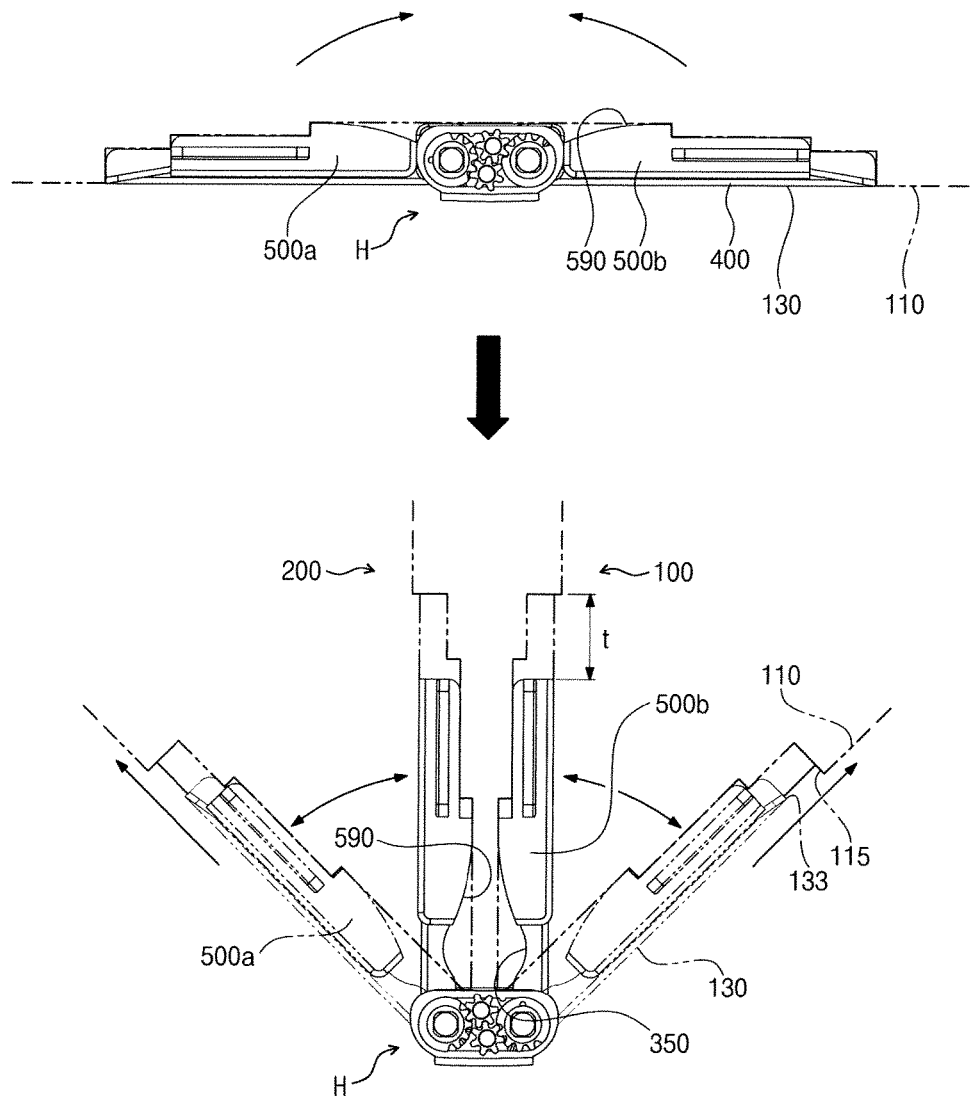

FOLDABLE DISPLAY DEVICE

CROSS REFERENCE TO RELATED APPLICATION

The present application claims priority to Korean Patent Application No. 10-2018-0060260, filed May 28, 2018, the entire contents of which is incorporated herein for all purposes by this reference.

BACKGROUND OF THE INVENTION

Field of the Invention

The present invention relates generally to a foldable display device. More particularly, the present invention relates to a foldable display device, wherein a first body and a second body of an electronic device having a foldable display part are rotatably connected to each other, and a rotation angle between the first and second bodies is efficiently set.

Description of the Related Art

Unless otherwise indicated in this specification, the descriptions set forth herein are not meant to be related art to the claims of this application, and are not to be admitted as related art.

Due to increasing industrial demand for portable electronic devices including portable terminals, portable electronic devices having various forms and functions meeting customer needs are being introduced.

General portable terminals, such as mobile phones, have a display part for displaying images, pictures, etc., and portable terminals having a function of watching TV through the display part or visually obtaining various information over a wired or wireless Internet have appeared.

Furthermore, the portable terminals have been developed in various forms tailored to consumer demand and functional characteristics, and have been developed variously as a foldable type, a slidable type, a bar type, etc.

Herein, a foldable type portable terminal denotes a terminal in which two bodies are hinged together and opened in order to expand a usable area, and has continuously been developed due to its superior structural characteristics.

Particularly, in recent years, development of a thin film transistor-liquid crystal display technology and weight reduction of other components have become possible, and generally, most portable terminals have become slimmer, and their demand is increasing day by day.

However, because the external profile of portable terminals in the related art has been developed on the basis of forms more suitable for performing communication functions such as voice call, message transmission, etc., there is a disadvantage in that it may be inconvenient to use a multimedia service. For example, the display part of a general portable terminal has a vertically long shape and thus is inconvenient for viewing digital multimedia broadcasts, video files, etc.

In an effort to solve such a problem, Korean Patent No. 10-0909713 disclosed "Hinge device for mobile phone" as a registered patent of the present applicant. In order to solve the above-mentioned problem, the exemplary embodiment of the this invention disclosed a hinge device for a mobile phone which is configured such that a cover of the mobile phone is rotatable by an open angle and a 360 degree angle with respect to a vertical direction while ultimately achieving structural stability of the entire device.

According to Korean Patent No. 10-0909713, there is a great advantage in that convenience of use can be enhanced and consumer demand to utilize the display part of the mobile phone in a relatively wide range can be satisfied. However, there is room for improvement, and it is necessary to develop a new type of hinge device and an electronic device using the same.

For example, in order to satisfy consumer demand for a large display screen even in the case of a small-size electronic device, it is necessary to provide an electronic device of a type in which a liquid crystal screen is provided on both of two bodies that are hingedly rotated together, and two individual liquid crystal screens are combined to form a single large screen when the electronic device is opened from a closed state. In addition, it is necessary to develop a hinge device of a type suitable for the same.

On the other hand, in such type of foldable display device, the display part may not be fully folded like a paper sheet but leave an arc-shaped curved portion having a predetermined radius. Thus, there is a need to minimize the curved portion to prevent a gap between both bodies of the foldable display device from being generated when the device is closed.

DOCUMENTS OF RELATED ART

Patent Document (Patent document 1) Korean Patent Application No. 10-2011-0047360

SUMMARY OF THE INVENTION

Accordingly, the present invention has been made keeping in mind the above problems occurring in the related art, and the present invention provides a foldable display device configured such that in a closed state, multiple bodies thereof are closed to be in close contact with each other so as to minimize the volume, while a flexible display part is folded in a manner that a portion curved in an arc-shape and opposed portions adjacent thereto of the flexible display part are compressed to form a minimum radius of curvature, so that the curvature of the portion curved is minimized and generation of a gap between the multiple bodies is prevented. Furthermore, in an opened state, a compressing force is implemented when the flexible display part is stretched out such that the portion curved in an arc-shape and the opposed portions adjacent thereto of the flexible display part are stretched out flat. Thus, the multiple bodies are prevented from generating a gap therebetween in a closed state and the flexible display part is maintained flat in an opened state.

In order to achieve the above object, according to one aspect of the present invention, there is provided a foldable display device including: a first body and a second body that are formed in the same shape as a plate and are arranged symmetrically with each other; a display part attached to the first body and the second body and configured to be folded or stretched out such that when the display part is folded, a curved arc-shaped portion is defined; and a hinge device assembled to connect the first body and the second body to each other, such that the hinge device is rotated within an opened state range where the first and second bodies are placed on the same plane and within a closed state range where the first and second bodies overlap each other.

According to the disclosed embodiment, it is possible to freely adjust an inclination angle of the hinge device so as to form an acute angle or obtuse angle of operation in addition to opening and closing operations of the hinge device, and it is possible to temporarily maintain the adjusted angle, leading to an improvement in user convenience.

Furthermore, according to the embodiment, in a closed state, the multiple bodies can be closed to be in close contact with each other so as to minimize the volume, while the flexible display part can be folded in a manner that the portion curved in an arc-shape and the opposed portions adjacent thereto of the flexible display part are compressed to form a minimum radius of curvature, so that the curvature of the portion curved can be minimized and generation of a gap between the multiple bodies is prevented. Furthermore, in an opened state, a compressing force can be implemented when the flexible display part is stretched out such that the portion curved in an arc-shape and the opposed portions adjacent thereto of the flexible display part can be stretched out flat. Thus, generation of a gap between the multiple bodies is prevented in a closed state and the flexible display part can be maintained flat in an opened state.

BRIEF DESCRIPTION OF THE DRAWINGS

The above and other objects, features and other advantages of the present invention will be more clearly understood from the following detailed description when taken in conjunction with the accompanying drawings, in which:

FIG. 1 is a perspective view showing a foldable display device in an opened state according to an embodiment of the present invention;

FIG. 2 is an exploded perspective view showing the foldable display device in the opened state according to the embodiment;

FIG. 3 is an exploded perspective view showing connection members and a cam connection part of the foldable display device according to the embodiment;

FIG. 4 is an exploded perspective view showing the cam connection part of the foldable display device according to the embodiment, FIG. 5 is an exploded perspective view of the FIG. 4, as viewed from another direction;

FIG. 6 is an exploded perspective view of the cam connection part according to the embodiment;

FIG. 7 is a perspective view showing the opened state of the foldable display device according to the embodiment;

FIG. 8 is an enlarged sectional view showing a hinge device in the opened state of FIG. 6;

FIG. 9 is an enlarged front view showing the cam connection part of FIG. 6;

FIG. 10 is an enlarged plan view showing the cam connection part of FIG. 6;

FIG. 11 is a perspective view showing the foldable display device in a closed state according to the embodiment;

FIG. 12 is an enlarged sectional view showing the hinge device in the closed state of FIG. 8;

FIG. 13 is an enlarged front view showing the cam connection part of FIG. 10;

FIG. 14 is an enlarged plan view showing the cam connection part of FIG. 10; and FIG. 15 is an enlarged sectional view showing movement of connection members of the hinge device in the opened state and in the closed state.

DETAILED DESCRIPTION OF THE INVENTION

Hereinbelow, exemplary embodiments of the present invention will be described in detail with reference to the accompanying drawings.

It should be understood that the following embodiments are presented to make complete disclosure of the present invention and help those who are ordinarily skilled in the art best understand the invention. Various changes to the following embodiments are possible and the scope of the present invention is not limited to the following embodiments.

Also, for convenience of understanding of the elements, in the figures, sizes or thicknesses may be exaggerated to be large (or thick), may be expressed to be small (or thin) or may be simplified for clarity of illustration, and technical terms defined in consideration of their function in the present invention may be varied according to the intention of a user, practice, or the like, so that the terms should be defined based on the contents of this specification.

As shown in FIGS. 1 to 3, the present invention includes a first body 100 and a second body 200 that are formed in the same shape as a plate and are arranged symmetrically with each other; and a hinge device H assembled to connect the first body 100 and the second body 200 to each other, such that the hinge device is rotated within an opened state range where the first and second bodies are placed on the same plane and within a closed state range where the first and second bodies overlap each other.

The present invention may be a portable device such as a notebook computer, an electronic dictionary, a PDA, etc. or a general portable terminal such as a mobile phone.

The first body 100 and the second body 200 constitute the body of a foldable display device A, and are configured to rotate with respect to each other.

The first body 100 may be provided with a display part 800 that is made up of a liquid crystal display (LCD), etc. to allow visual images, etc. to be displayed thereon. The second body 200 may be provided with and a keypad, etc. that is used to input information.

Alternatively, the display part 800 may be entirely provided on the first body 100 and the second body 200. In this case, the display part 800 is made of a foldable material.

The display part 800 is attached to the first body 100 and the second body 200 and is folded or stretched out. When folded, a curved arc-shaped portion 820 may be defined.

The first body 100 or the second body 200 may include: a hinge cover 130 rotatably connected to the hinge device H and having a rail groove 132 formed on opposite sides thereof; an outer cover 110 cooperating with the hinge device H and having a guide rail 112 formed on opposite sides thereof, the guide rail being inserted into the rail groove 132 of the hinge cover 130 and providing a section where the hinge cover 130 is moved; and a support plate 120 connected to the hinge device H and coupled to the outer cover 110 in an overlapping manner, the support plate having the display part 800 attached thereto.

The support plate 120 has a guide lid 122 protruding from a side thereof to cover first and second guide parts 300 and 400, and an upper surface of the guide lid 122 has an arc-shaped curved portion 124 (see FIG. 1).

The curved portion 124 is configured to accommodate the curvature of the curved arc-shaped portion 820 of the display part 800 when the display part is folded.

In other words, the arc-shaped portion 820 having a predetermined curvature is formed when the display part 800 is folded. Accordingly, the curved portion 124 is formed at the guide lid 122 to define a space for accommodating the arc-shaped portion 820, whereby it is possible to prevent breakage.

The first and second guide parts 300 and 400 that will be described later respectively have arc-shaped recesses 350 and 450 each formed on opposite side walls of each of the first and second guide parts, such that the arc-shaped recesses accommodate the curved arc-shaped portion 820 of the display part 800 (see FIGS. 6 and 13).

The outer cover 110 has a receiving recess 114 formed at a side thereof to receive the first and second guide parts 300 and 400, and an arc-shaped curved portion 118 famed on an upper side surface thereof for the same reason as described above.

The receiving recess 114 has a seat recess 116 formed at opposite sides thereof such that the connection members 500a and 500b that will be described later are engaged with the seat recesses.

The hinge device H includes: a base part 2 provided to have a length corresponding to a length of the first and second bodies 100 and 200 and having first and second shafts 21 and 22 famed symmetrical with each other; a cam connection part 4 configured with first and second cam gears 41 and 42 respectively provided at ends of the first and second shafts 21 and 22 to be engaged with each other, the cam connection part being configured to transmit a rotational force such that the first and second shafts 21 and 22 are rotated simultaneously; the first and second guide parts 300 and 400 respectively having coupling portions 310 and 410 each provided at a side of each of the first and second guide parts and coupled to the first and second shafts 21 and 22, the first and second guide parts being comprised of plate members 320 and 420 having a predetermined area and respectively connected to the coupling portions 310 and 410, the plate members respectively having guide rails 330 and 430 each inclinedly formed at opposite sides of each of the plate members; the connection members 500a and 500b respectively having slits 520a and 520b each inclinedly formed at a side of each of the connection members such that the guide rails 330 and 430 of the first and second guide parts 300 and 400 are engaged into the slits 520a and 520b, the connection members being respectively mounted on support plates 120; and first and second hinge covers 130 respectively coupled to the ends of the first and second shafts 21 and 22 to be rotatable and each having a rail groove 132 formed at opposite sides thereof.

Outer covers 110 of the first and second bodies 100 and 200 each has guide rails 112 formed at opposite sides thereof and fitted into rail grooves 132 of the first and second hinge covers 130, such that the guide rails provide sections where the first and second hinge covers 130 are moved.

The first and hinge covers 130 are coupled to the first and second bodies 100 and 200, whereby the first and second hinge covers 130 rotate in cooperation with rotation of the first and second bodies 120 and 200 and at the same time a change in length of the first and second bodies 120 and 200 is performed.

In the change in length described above, referring to FIGS. 7 to 9, when the first and second bodies 100 and 200 are opened, the first and second bodies 100 and 200 are inserted into the first and second hinge covers 130 along the guide rails 112.

Conversely, referring to FIGS. 11 to 13, when the first and second bodies 100 and 200 are closed, a center of the display part 800 is curved to define the arc-shaped portion 820, and thus the first and second bodies 100 and 200 are withdrawn out of the first and second hinge covers 130.

Accordingly, a distance t is defined between a stepped portion 115 of each of the guide rails 112 of the first and second bodies 100 and 200 and an end 133 of each of the first and second hinge covers 130 (see FIGS. 7 and 12).

The first and second guide parts 300 and 400 respectively have the arc-shaped recesses 350 and 450 each formed on the opposite side walls of each of the first and second guide parts so as to accommodate the curved arc-shaped portion 820 of the display part 800.

The connection members 500a and 500b each has a curved portion 590 coming into contact with a side of arc-shaped portion 820 of the display part 800. It is preferable that curved portions 590 of the connection members 500a and 500b have the same curvature as the curved portion 124 of the guide lid 122.

Accordingly, as shown in FIG. 12, when the first and second bodies 100 and 200 are closed, the center of the display part 800 is curved to define the arc-shaped portion 820, and then both the curved portions 590 of the connection members 500a and 500b and the curved portion 124 of the guide lid 122 compress portions adjacent to the arc-shaped portion 820, whereby the display part 800 is folded except for the arc-shaped portion 820. Thus, the curvature of the arc-shaped portion 820 is minimized while the portions adjacent to the arc-shaped portion are in close contact with each other, so that the first and second bodies 100 and 200 are closed without generating a gap therebetween.

Meanwhile, the first shaft 21 and the second shaft 22 must be rotated at the same time in opposite directions, and transmission of a rotational force generated thereby is performed by the cam connection part 4.

The cam connection part 4, as shown in FIGS. 4 and 5, includes: the first and second cam gears 41 and 42 respectively coupled to the first and second shafts 21 and 22 and each having gear teeth 410 famed on the outer periphery thereof, the first and second cam gears each having concave portions and convex portions 422 formed at a side thereof; a connection gear 43 engaged with gear teeth 410 of the first and second cam M gears 41 and 42 and transmitting a rotational force; a third cam 45 coupled to the first and second shafts 21 and 22 and having concave portions and convex portions 450 corresponding to the recesses and the protrusions of the first and second cam gears 41 and 42; first and second springs 46 and 47 respectively coupled to the first and second shafts 21 and 22 and elastically supported by the third cam 45 and a step 29 of the base part 2; and a cap 28 assembled to accommodate the first and second cam gears 41 and 42, the connection gear 43, the third cam 45, and the first and second springs 46 and 47. The first and second shafts 21 and 22 are inserted into through holes 292 formed in the step 29 of the base part 2.

Thus, when either one of the first and second shafts 21 and 22 is rotated, any one of the first and second cam gears 41 and 42 connected thereto is rotated.

For example, when the first cam gear 41 is rotated, the second cam gear 42 is also rotated by power transmitted from the connection gear 43. Herein, the first cam gear 41 and the second cam gear 42 are rotated in opposite directions.

In this process, when the first cam gear 41 and the second cam gear 42 are rotated, the convex portions 422 of each thereof push the convex portions of the third cam 45 and this action is performed at intervals of about 90°.

The convex portions of the first cam gear 41 and the second cam gear 42 are formed oppositely to be symmetrical with each other at intervals of 180°.

This is because the third cam 45 has four convex portions 450 famed at intervals of 90°.

When the convex portions 422 of the first and second cam gears 41 and 42 push the convex portions 450 of the third cam 45, the first and second springs 46 and 47 are compressed, and then when the first and second cam gears 41 and 42 are inserted into the recesses of the third cam 45, the first and second springs 46 and 47 are expanded and exert an elastic fixing force.

Thus, the first and second bodies 100 and 200 may be opened or closed in a segmented manner at intervals of 30°.

Of course, a rotation angle of the first and second bodies 100 and 200 may be set variously. In other words, the angle may be set by increasing or decreasing the number of concave and convex portions of the first and second cam gears 41 and 42 and the number of the concave and convex portions of the third cam 45.

The operation of the embodiment will be described below.

As shown in FIGS. 7 to 9, in an opening operation, when the first and second bodies 100 and 200 are opened in opposite directions, the first and second guide parts 300 and 400 are rotated in opposite directions to form a substantially horizontal plane, while the first and second bodies 100 and 200 are moved inwardly of the first and second hinge covers 130 so that the ends of the guide rails 112 are brought into contact with each other. Accordingly, the movement of the first and second bodies is stopped and opened horizontally.

Herein, referring to FIG. 8, the guide rails 330 and 340 of the first and second guide parts 300 and 400 are moved along the slits 520*a* and 520*b* of the opposite connection members 500*a* and 500*b* to reach positions upward in the drawing, so that the first and second bodies 100 and 200 are opened.

The movement of the connection members 500*a* and 500*b* is shifted in an upward inclined direction (reference in FIG. 8) by inclination angles of the slits 520*a* and 520*b* of the opposite connection members 500*a* and 500*b*, so that the first and second bodies 100 and 200 are rotated while projecting outwardly (upward in FIG. 8).

Thereafter, stepped portions 115 of the first and second bodies 100 and 200 and ends 133 of the first and second hinge covers 130 are brought into contact with each other.

On the other hand, in a closing operation as shown in FIGS. 11 to 13, when the first body 100 and the second body 200 are closed, the guide rails 330 and 430 are moved in opposite directions (directions opposite to the above-described opening operation) along the rail grooves 132.

The stepped portions 115 of the guide rails 112 of the first and second bodies 100 and 200 and the ends 133 of the first and second hinge covers 130 are distanced from each other at a predetermined distance t (see FIG. 12).

When the first and second bodies 100 and 200 are closed in such a manner, the display part 800 is curved and the arc-shaped portion 820 is defined at the center thereof (see FIG. 13). The curved arc-shaped portion 820 is accommodated in the arc-shaped recesses 350 and 450 each formed on the opposite side walls of the first and second guide parts 300 and 400.

Furthermore, both the curved portions 590 of the connection members 500*a* and 500*b* and the curved portion 124 of the guide lid 122 compress the portions adjacent to the arc-shaped portion 820, whereby the display part 800 is folded in an overlapping manner except for the arc-shaped portion 820. Thus, the curvature of the arc-shaped portion 820 is minimized while the portions adjacent to the arc-shaped portion are in close contact with each other, so that the first and second bodies 100 and 200 are closed without a gap being generated therebetween.

Meanwhile, the rotation angle of the first body 100 and the second body 200 may be set variously to 45°, 135°, 225°, 315° etc., by the cam connection part 4.

When either one of the first body 100 and the second body 200 is rotated, any one of the first and second shafts 21 and 22 connected thereto is rotated, and any one of the first and second cam gears 41 and 42 is rotated in cooperation therewith.

For example, when the first cam gear 41 is rotated, the second cam gear 42 is also rotated by power transmitted from the connection gear 43, and the first cam gear 41 and the second cam gear 42 are rotated in opposite directions.

In this process, when the first cam gear 41 and the second cam gear 42 are rotated, the convex portions 422 of each thereof push the convex portion of the third cam 45 and this action is performed at intervals of about 90°.

The convex portions of the first cam gear 41 and the second cam gear 42 are formed oppositely to be symmetrical with each other at intervals of 180°.

This is because the third cam 45 has four convex portions 450 formed at intervals of 90°

When the convex portions 422 of the first and second cam gears 41 and 42 push the convex portions 450 of the third cam 45, the first and second springs 46 and 47 are compressed, and then when the first and second cam gears 41 and 42 are inserted into the recesses of the third cam 45, the first and second springs 46 and 47 are expanded and exert an elastic fixing force.

Thus, the first and second bodies 100 and 200 may be opened or closed in a segmented manner at intervals of 30°.

Meanwhile, upon the opening operation after the closing operation, the arc-shaped portion 820 of the display part 800 may not be completely immediately stretched out but may leave a curved crease. However, in the present invention, the curved portions 590 of the connection members 500*a* and 500*b* serve to push the display part 800 without leaving the curved residue.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A foldable display device, comprising:
   a first body and a second body that are formed in the same shape as a plate and are arranged symmetrically with each other;
   a display part attached to the first body and the second body and configured to be folded or stretched out such that when the display part is folded, a curved arc-shaped portion is defined; and
   a hinge device assembled to connect the first body and the second body to each other, such that the hinge device is rotated within an opened state range where the first and second bodies are placed on the same plane and within a closed state range where the first and second bodies overlap each other,
   wherein the hinge device includes:
   a base part provided to have a length corresponding to a length of the first and second bodies and having first and second shafts formed symmetrical with each other;
   a cam connection part configured with first and second cam gears respectively provided at ends of the first and second shafts to be engaged with each other, the cam connection part being configured to transmit a rotational force such that the first and second shafts are rotated simultaneously;

first and second guide parts respectively having coupling portions each provided at a side of each of the first and second guide parts and coupled to the first and second shafts, the first and second guide parts being comprised of plate members having a predetermined area and respectively connected to the coupling portions, the plate members respectively having guide rails each inclinedly formed at opposite sides of each of the plate members;

connection members respectively having slits each inclinedly formed at a side of the connection members such that the guide rails of the first and second guide parts are engaged into the slits, the connection members being respectively mounted on support plates; and first and second hinge covers respectively coupled to the ends of the first and second shafts to be rotatable and each having a rail groove formed at opposite sides thereof.

2. The foldable display device of claim 1, wherein the first and second guide parts respectively have arc-shaped recesses each formed on opposite side walls of each of the first and second guide parts, such that the arc-shaped recesses accommodate the curved arc-shaped portion of the display part.

3. The foldable display device of claim 1, wherein outer covers of the first and second bodies each has guide rails formed at opposite sides thereof and fitted into rail grooves of the first and second hinge covers, such that the guide rails provide sections where the first and second hinge covers are moved.

4. The foldable display device of claim 1, wherein the cam connection part includes:

the first and second cam gears respectively coupled to the first and second shafts and each having gear teeth formed on an outer periphery thereof, the first and second cam gears each having concave portions and convex portions formed at a side thereof;

a connection gear engaged with gear teeth of the first and second cam gears and transmitting a rotational force;

a third cam coupled to the first and second shafts and having concave portions and convex portions corresponding to the recesses and the protrusions of the first and second cam gears;

first and second springs respectively coupled to the first and second shafts and elastically supported by the third cam and a step of the base part; and a cap assembled to accommodate the first and second cam gears, the connection gear, the third cam, and the first and second springs.

5. The foldable display device of claim 4, wherein the convex portions of the first cam gear and the second cam gear are formed oppositely to be symmetrical with each other at intervals of 180°, and the third cam has four convex portions formed at intervals of 90°.

* * * * *